United States Patent [19]
Larkin

[11] 3,735,009
[45] May 22, 1973

[54] ELECTRIC INDUCTION HEATING FURNACE AND METHOD FOR PREHEAT THEREOF

[76] Inventor: John M. Larkin, 9411 South Turner St., Evergreen Park, Ill. 60642

[22] Filed: Dec. 27, 1971

[21] Appl. No.: 212,082

[52] U.S. Cl. ................................................13/29
[51] Int. Cl. ..............................................H05f 5/14
[58] Field of Search ........................13/26, 28, 29, 30

[56] References Cited

UNITED STATES PATENTS 1,638,660  8/1927  Foley.......................................13/29

FOREIGN PATENTS OR APPLICATIONS 886,485  10/1942  France ...................................13/29

Primary Examiner—Roy N. Envall, Jr.
Attorney—Paul J. Reising

[57] ABSTRACT

In accordance with the invention there is provided a channel type electric induction furnace for heating molten metal comprising a refractory lined receptacle having an open-ended hearth portion of large cross sectional area for holding a mass of the molten metal and an induction heating portion comprising a channel which is of small cross sectional area and which is formed by a refractory covered electrical induction coil positioned adjacent a side wall and a bottom wall of the receptacle, the end of the channel adjacent the side wall being oriented in a direction of less than about 45° from vertical and aligned with the open end of the hearth portion, and the end of the channel adjacent the bottom wall being oriented in a direction of less than about 60° from horizontal, the two ends of the channel communicating with the hearth portion in divergent directions.

12 Claims, 6 Drawing Figures

INVENTOR.
John M. Larkin

ELECTRIC INDUCTION HEATING FURNACE AND METHOD FOR PREHEAT THEREOF

This invention relates to an improved structure and method for preparing for operation a channel type electric induction heating furnace for molten metal of the type having a hearth portion of large cross section to hold a large bath of the molten metal and a channel of small cross section communicating at both ends thereof with the hearth portion and partially surrounding an electrical induction coil such that the metal in the hearth portion circulates through and is inductively heated in the channel.

Furnaces of the type described have been in common use for many years and, as evidenced by the numerous patents and other publications relating to such furnaces, a great amount of work has been done in improving or seeking to improve the design of the channel in order to increase induction heating efficiency and to improve the circulation of metal from the hearth through the channel. However, all of this work overlooks the fact that one of the major disadvantages to such induction heating furnaces is that once they are put into operation they cannot be shut down except with the penalty that prior to being put back into operation there is requirement for, at best, a long and tedious job of preheating the refractory lining or, at worst, the even more expensive job of completely replacing the refractory lining. Of course even with a relined furnace there is require-ment for preheat of the furnace, including the channel, since without any preheating of the refractory prior to introduction of the molten metal, refractory failure of freezing of molten metal in the channel may occur. Such preheating is usually accomplished by directing hot burning gases, such as natural gas, into the furnace from the top open end thereof. But preheat of the refractory, once the furnace has been in operation, and after, a shutdown, is especially difficult and hazardous because the ceramic refractories in common use as the liner material undergo various irreversible changes in physical characteristics after having been at molten metal temperature. Hence after subsequent cooling it is most difficult to again reheat the refractory without there being resultant open cracks and other degredation which can lead to serious furnace failure upon the reintroduction of molten metal. Because of these difficulties and hazards, the most common practice is to at least partially reline the furnace with new refractory after a furnace shutdown. It is the large expense and delay of relining a furnace which dictates that the furnace be kept in continual operation for an extended period, usually about six months, prior to any shutdown. Hence it is that during nonproduction periods, such as holidays or weekends, when all other operations in a foundry are shut down, special provisions are made and expenses incurred for workmen to keep the induction heating furnaces in operation.

Actually, the heart of the problem is not with respect to the refractory lining in the hearth portion of the furnace but rather with respect to the refractory lining in the channel. This is because at the present state of the art the channel designs are such as to render the refractory lining in the channel relatively inaccessible for preheat by the flow of hot gases directed into the open end of the furnace. This inaccessibility for purposes of adequate and uniform preheat of the channel in turn stems from the fact that in channel design the emphasis has, as stated above, been placed on attaining optimum induction heating efficiency. In recognition of the problem, and as a possible solution, it has been suggested that the ends of the channel be provided with openings to the exterior of the furnace and with removable plugs in these openings such that with the plugs removed the channel is made accessible for efficient preheat by the flow of hot gases. The difficulty with this, however, is that with the use of removable plugs there are serious sealing problems and an attendant hazard of leakage or complete plug failure during furnace operation.

It is an object of the present invention to provide an induction heating furnace of the type described wherein the channel structure is such as to enable rapid and efficient preheat of the channel along with the entire hearth portion of the furnace while yet attaining excellent efficiency in induction heating and in metal flow through the channel during furnace operation. More specifically, it is an object of the present invention to provide an induction heating furnace of the type described wherein the channel structure is such that it is readily accessible for the flow of preheating hot gases therethrough and is additionally such as to provide excellent gas flow characteristics, with minimum turbulence, for flow of the hot gases from the hearth portion through the channel and then out into the hearth portion again for uniform efficient preheat of the entire furnace — and all of this but yet attaining good induction heating efficiency and metal flow through the channel during furnace operation.

Briefly, these objects are accomplished in accordance with the invention by a furnace wherein the channel extends through an angle, around the induction heating coil, such that the ends of the channel communicating with the open-ended hearth portion extend in diverging directions, one end portion of the channel being oriented in a direction which is no more than about 45° from vertical and the other end portion of the channel being oriented in a direction which is no more than about 60° from horizontal. The end portion oriented no more than about 45° from vertical is adjacent a side wall of the furnace and is directly accessible for linear flow of hot gases directed into the channel from the opening at the top of the furnace. The channel end portion oriented at no more than about 60° from horizontal is adjacent a bottom wall of the furnace and enables the hot gases to flow freely from the channel and sweep across the refractory lining in the hearth portion. In the preferred embodiments both end portions of the channel are flaired or tapered outwardly such that the cross section of each of the end portions progressively increases as the end of the channel approaches the hearth portion with which it communicates. Also, in the most preferred embodiments the channel end portion adjacent the furnace side wall is oriented substantially vertical and the channel end portion adjacent the bottom wall is oriented at from 0° to 30° to horizontal, and the channel has an arcuate center portion which is of uniform cross section and extends through an arc, about the axis of the induction heating coil, of about 90°.

With such structure hot gases directed toward the channel from the top of the furnace flow rapidly and with minimum turbulence through the channel and then out into the hearth portion so as to rapidly and efficiently preheat the entire furnace. Yet, the channel structure also provides excellent induction heating efficiency and excellent flow characteristics for flow of molten metal through the channel during furnace operation.

Other objects, features and advantages of the invention will appear more clearly from the following detailed description of various embodiments thereof made with reference to the drawings in which.

Figure 1:
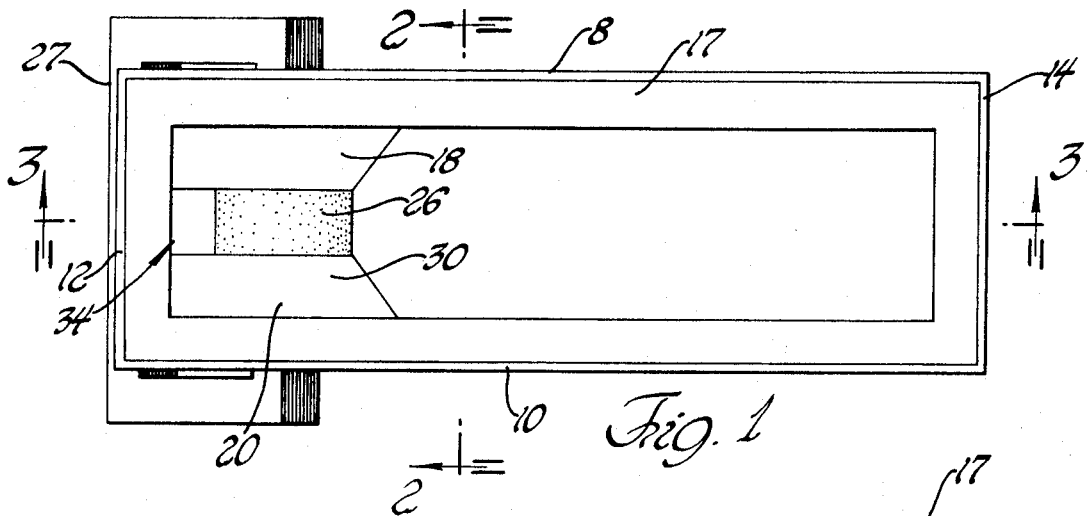
FIG. 1 is a top view of a preferred embodiment of the invention.
Figure 2:
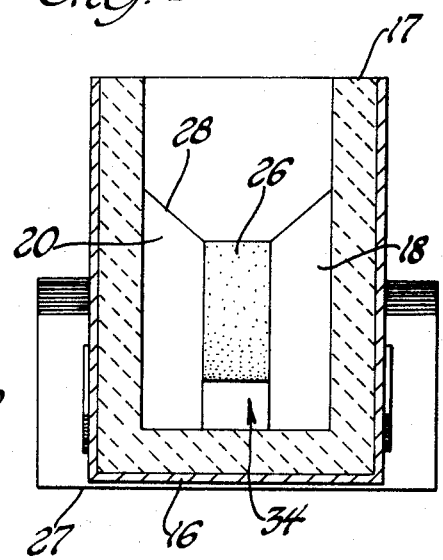
FIG. 2 is a view taken on the line 2—2 of FIG. 1.
Figure 3:
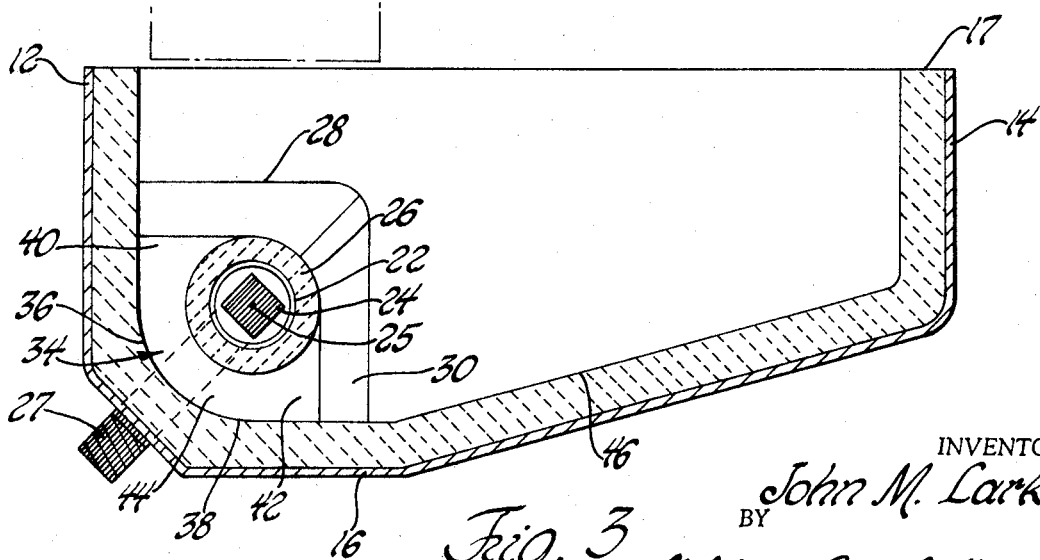
FIG. 3 is a view taken on the line 3—3 of FIG. 1.

Referring now to FIG. 1–3, the furnace shown comprises a receptacle having side walls 8, 10, 12 and 14 and a bottom wall 16, the outer surfaces of the walls being of metal and the inner surfaces being of a conventional ceramic refractory lining 17. Each surface is shown as a flat section for simplicity. These surfaces may be of any desirable shape and size ratio, the governing parameters being the particular application and use of the furnace. The shape of the furnace hearth is independent of the shape of the indicator unit except that in all embodiments the hearth extends both above and to one side of the induction heating portion of the furnace. The portions of the side walls 8 and 10 adjacent the bottom wall and the side wall 12 are formed by refractory bodies 18 and 20. Extending across the receptacle between these refractory bodies 18 and 20 is a conventional induction heating coil 22, with laminated metal core 24, the axis 25 of the coil being parallel to side wall 12 and bottom wall 16 and the coil being provided with a cylindrical ceramic refractory covering 26. (The portion of the yoke which constitutes the core 24 but is outside the furnace is shown at 27.) Each of the refractory bodies 18 and 20 has an upper surface which is tapered downwardly toward the refractory covering on the induction coil, such tapered surface for block 20 being shown at 28. Also, the surface of each of the refractory bodies 18 and 20 which is oppositely disposed from the surface abutting wall 12 is likewise tapered inwardly in the direction of the refractory covering on the coil, such tapered surface for the refractory body 20 being shown at 30.

The assembly as described provides a furnace receptacle having two portions. One of these is the hearth portion 30 which constitutes the entire space above and, as shown, to the right of the refractory covering 26 on the induction heating coil. The other portion is the induction heating portion which comprises the refractory covered induction heating coil and the channel 34, which constitutes the space between the refractory covered induction heating coil and the wall portions 36 and 38 of side wall 12 and bottom wall 16 respectively. The hearth portion which is of large cross sectional area is, of course, for holding a large mass of molten metal heated by circulation thereof through the channel of the induction heating portion. The channel 34 of the induction heating portion is, on the other hand, of relatively very small cross sectional area and, as stated, functions to inductively heat the molten metal from the hearth portion as it flows through the channel. In the FIG. 1–3 embodiment, the width of the channel, in the direction parallel to the axis of the induction coil, is about one third the width of the hearth portion. Because the channel has tapered end portions as immediately hereinafter discussed, the dimension of the channel in a direction perpendicular to said width varies from a dimension at each end of the channel about equal to said width to a lesser dimension at the central portion of the channel.

Referring now to FIG. 3, it will be seen that the channel has one end portion, an entrance portion 40, which is tapered such that the cross section thereof, progressively increases as this portion approaches the hearth portion with which it communicates. This entrance portion 40 extends vertically or, in other words, in a direction at a right angle to the plane of the top of the furnace and to the plane of the upper surface of the molten metal in, or to be placed in, the furnace. The other end portion, the exit portion 42, of the channel extends in a direction which is horizontal. Hence, the inlet and outlet portions communicate with the hearth portion in divergent directions and in this embodiment are at an angle to each other of about 90°. The exit portion, like the entrance portion, is tapered such that the cross section thereof progressively increases as the exit portion approaches the hearth portion of the furnace with which it communicates. The remainder of the channel, the arcuate central portion 44, is of uniform cross sectional area and extends through an angle, around the axis of the induction coil, of 90°.

In this preferred embodiment, the portion 46 of the bottom wall, which constitutes a wall of hearth portion of the furnace, extends upwardly at an angle of about 15° to horizontal.

For preheat just prior to placing the furnace into operation, a hot gas generator, schematically shown at 48 in FIG. 3, is placed immediately over the open end of the furnace above the channel and the hot burning gases are directed down into the channel. The hot gases flow through the tapered end portion 40, through and around the central portion 34 and then out through the tapered end portion 42 into the hearth portion adjacent and upwardly of wall 46. Because of the shape of the channel, as described, the hot gases flow smoothly through the channel with relatively little restriction or turbulence thereby uniformly heating the entire refractory lining in the channel. Once the channel is brought up to the temperature required, additional hot gases can be directed into the remaining portions of the furnace while yet continuing to direct the hot gases into the channel to maintain the channel at the high temperature. When the hot gases are directed downwardly into the hearth portion of the furnace to the right, as shown, of the channel, there is more turbulence and less free flow of the gases through the channel; however since by this time the channel is already heated to the required temperature, this is of no disadvantage.

After the furnace is preheated as aforesaid, molten metal is admitted to the furnace and the induction coil is put into operation by the flow of alternating current therethrough. Thereupon the induction heating channel functions in the manner well known in the art.

Figure 4:
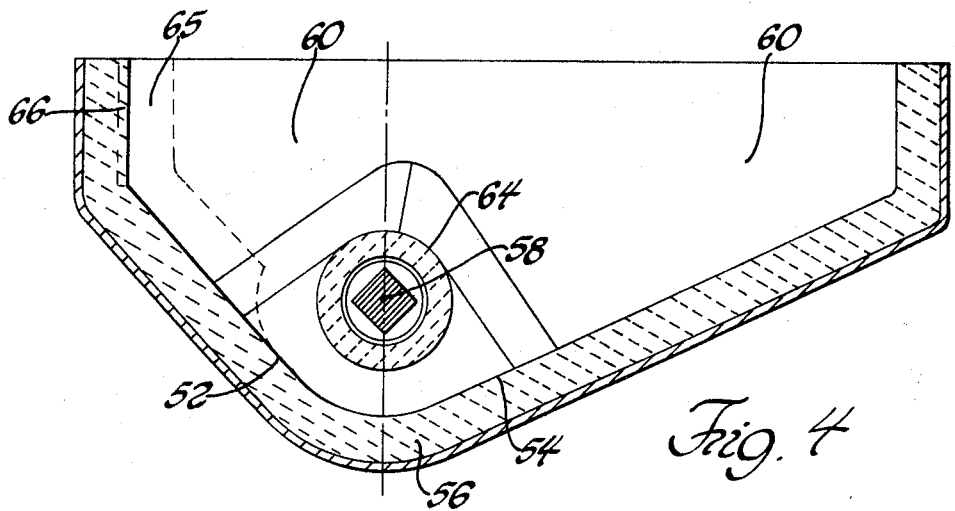
FIGS. 4, 5 and 6 are views similar to that of FIG. 2, i.e., side views in section; but of other embodiments of the invention.

The embodiment shown in FIG. 4 differs from that shown in FIGS. 1–3 as regards the orientation of the end portions of the channel. In the FIG. 4 embodiment the inlet portion of the channel, of which the outer wall is formed by wall portion 52, is oriented in a direction about 30° from vertical and the outlet channel portion, of which the outer wall is formed by wall portion 54, is oriented in a direction about 30° upwardly from horizontal. Like the embodiment shown in FIGS. 1-3, the arcuate central portion 56 of the channel is of uniform cross section and extends through an arc, about the axis 58 of the induction coil, of 90° and the end portions of the channel which communicate with the hearth portion extend in divergent directions at an angle of about 90° to each other. Also as in the FIG. 1-3 embodiment, both end portions of the channel are tapered outwardly in the direction of the hearth portion 60 of the furnace, this by reason of the fact that, just as in the FIG. 1-3 embodiment, the refractory covering 64 on the induction coil is cylindrical.

As has been indicated above, the emphasis in channel design heretofore has generally been toward the attainment of maximum induction heating efficiency, and to attain this it is desirable that the channel for the most part be of uniform relatively small dimension, in a direction radially of the induction coil, and that this portion of the channel of uniform relatively small dimension wrap around the induction coil as much as feasible, commensurate with attaining good metal flow into and out of the channel. As distinguished from this, and as has also been stated above, the emphasis in the present invention to attain greatly improved channel preheating characteristics and yet without great sacrifice in induction heating efficiency. But it is within the purview of the invention, in order to get the best of both worlds, so to speak, to provide means whereby, after the channel has been preheated, a suitably shaped block or blocks of refractory can be secured to a wall of the furnace, or to the refractory covering on the induction coil, to thereby increase the extent of wrap of the uniformly small dimensioned portion of the channel around the induction coil or, in other words, to change the direction of one or both of the inlet and outlet ends of the channel. This is illustrated in FIG. 4, a block of refractory, shown in broken outline at 65, being secured to the side wall of the furnace, as shown, after preheat of the channel. It will be seen that the shape of the refractory block 65 is such as to fit snugly against the side walls of the furnace, and into the upper end portion of the channel to thereby change the direction of the said upper end portion of the channel and increase the extent to which the uniformly small dimensioned portion of the channel wraps around the induction coil. One means for removably attaching the refractory block 65 to the furnace wall is to provide the wall with one or more blind ended vertical slots, as illustrated in broken outline at 66, of wedge-shaped cross section (the small end of the wedge being at the inner surface of the wall), and the refractory block being shaped with an elongated vertical wedge-shaped tongue or tongues which slide matingly into the slot or slots. It will be seen, therefore, that by way of placing the refractory block 65 in the furnace after preheat of the channel, the shape of the exposed surface of the refractory in the furnace adjacent the channel is so altered as to alter the shape of the channel. The refractory block can, if desired, be preheated prior to being secured in the furnace or it can be preheated after being secured in the furnace while continuing to heat the other portions of the furnace.

Figure 5:
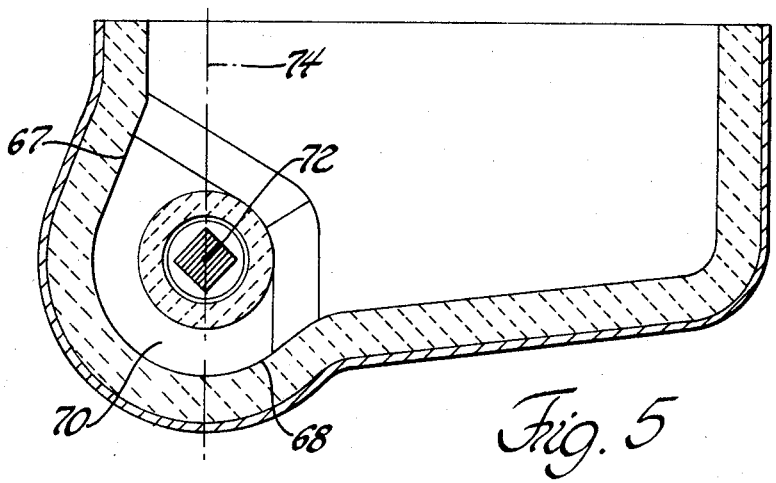

In the embodiment shown in FIG. 5, the wall portion 67 which constitutes the outer wall of the inlet portion of the channel, is, as in the FIG. 4 embodiment, oriented in a direction about 30° from vertical; however, in the FIG. 5 embodiment the 30° tilt from vertical is in the direction toward the induction coil as distinguished from the FIG. 4 embodiment wherein the 30° tilt from vertical is in a direction away from the induction coil. As in the FIG. 4 embodiment, so also in the FIG. 5 embodiment the wall portion 68 which constitutes the outer wall of the outlet portion of the channel is oriented in a direction about 30° upwardly from horizontal. Because of the difference, as between this FIG. 5 embodiment and the FIG. 4 embodiment, in the orientation of the inlet portion of the channel, as aforesaid, the central channel portion 70 of uniform cross section in the FIG. 5 embodiment extends through an arc, about the axis of the induction coil, of about 150°. This is superior from the standpoint of induction heating efficiency but it is not as advantageous as the FIG. 1-3 embodiment or the FIG. 4 embodiment as regards attainment of optimum free flow of the hot gases for most effective and rapid preheat of the channel. The smaller the angle of divergence between the directions of the inlet portion and the outlet portion in their communication with the hearth portion of the furnace, the greater the restriction to free low-turbulence preheat gas flow and it is much preferred that the angle not be less than 30°, an angle of between 50° and 120° being superior in the attainment of rapid efficient preheat commensurate with good induction heating efficiency. In the FIG. 5 embodiment the inlet and outlet portions of the channel communicate with the hearth portions in directions which are at about a 60° angle to each other. It will be noted that in this embodiment, as in all the other embodiments shown and described, the axis of the induction heating coil, shown at 72 in FIG. 5, is in a vertical plane 74 disposed inwardly (toward the center of the furnace) of the side wall 76 and the inlet portion of the channel is aligned with the open end of the hearth portion of the furnace. Hence, in the preheating of the channel by directing hot gases therethrough, there is straight-line access to the channel from thereabove, at the open end of the furnace, this being important for efficient, simple and rapid preheat.

Figure 6:
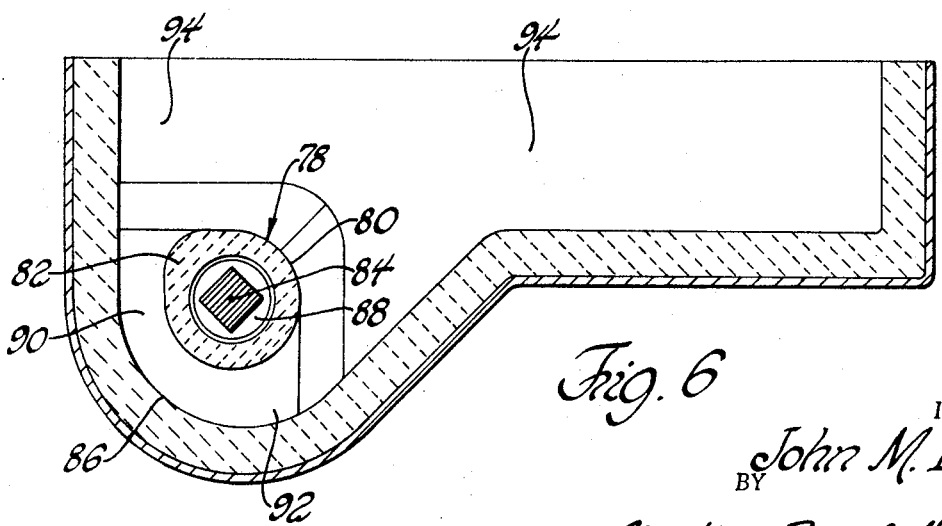

In all of the embodiments thus far described the refractory covering on the induction coil is cylindrical and of uniform thickness, and the center of curvature of the cylindrical refractory covering on the coil constitutes the center of curvature of the outer wall of the arcuate central portion of the channel. FIG. 6 shows an embodiment wherein the induction heating portion of the furnace is asymmetrical, and it is asymmetrical in two respects. First, the refractory covering 78 on the induction coil is not entirely cylindrical but instead has a portion 80 which is cylindrical and of uniform thickness and a portion 82 which is noncylindrical and of nonuniform thickness. Secondly, whereas the center of curvature of the cylindrical portion 80 of the refractory covering constitutes the axis 84 of the induction coil, the center of curvature of the cylindrical outer wall portion 86 of the channel is at a point 88 displaced toward the right (as shown) of the axis of the induction coil. Hence, in this embodiment most of that portion 90 of the channel which is of uniform cross section is not arcuate shaped but instead is linear and extends in a vertical direction, and the outlet portion 92 of the channel is tapered not only by reason of the cylindrical shape of the refractory covering at the portion thereof adjacent the outlet but also by reason of the center of curvature of the outer wall of the channel being displaced to the right of the center of the curvature of the cylindrical portion of the refractory covering on the induction coil. In this embodiment shown in FIG. 6 the channel inlet is vertical and the outlet portion of the channel is oriented in a direction about 40° upwardly from horizontal. Hence, the inlet and outlet portions extend toward the hearth portion of the furnace in divergent directions at an angle to each other of about 50°.

As alluded to above, it will be noted that in all the embodiments of the invention the hearth portion extends above and also to one side of the induction heating portion, the channel inlet communicating with that portion of the hearth which is above the induction coil and the channel outlet communicating with that portion of the hearth which is to one side of the induction coil. This relationship between the location and the shape of the hearth to the location and shape of the induction heating channel is inherent to the key channel features as have been described.

In construction of furnaces in accordance with the invention, the portion of the furnace which constitutes or includes the refractory covered induction heating coil and the channel should preferably be built as a separate unit which is then bolted or otherwise suitably removably secured to the remainder of the furnace, this in accordance with well known practice in the art.

It will be understood that while the invention has been described in its particulars with reference to various embodiments thereof, changes and modifications may be made within the full and intended scope of the claims which follow.

The embodiments of the invention in which an exclusive property or privilege is claimed are defined as follows:

1. A channel type electric induction furnace for heating molten metal comprising a refractory lined receptacle having an open-ended hearth portion of large cross sectional area for holding a mass of the molten metal and an induction heating portion comprising a channel which is of small cross sectional area and which is formed by a refractory covered electrical induction coil positioned adjacent a side wall and a bottom wall of the receptacle, said channel having a central portion of arcuate shape, the end of the channel adjacent the side wall being oriented in a direction of less than about 45° from vertical and aligned with the open end of the hearth portion, and the end of the channel adjacent the bottom wall being oriented in a direction of less than about 60° from horizontal, the two ends of the channel communicating with the hearth portion in divergent directions.

2. An electric induction furnace as set forth in claim 1 wherein the central portion of said channel is of uniform cross sectional area and wherein the end portions of said channel are tapered outwardly such that the cross section of each of the end portions progressively increases as the end of the channel approaches the hearth portion with which it communicates.

3. An electric induction furnace as set forth in claim 1 wherein said central portion of the channel extends through an arc, about the axis of the induction coil, of from about 90° to 150°.

4. An electric induction furnace as set forth in claim 3 wherein the refractory covering on said induction coil is cylindrical and of uniform thickness.

5. An electric induction furnace as set forth in claim 1 wherein the divergent directions of said ends of said channel are at an angle to each other of from 30° to 120°.

6. An electric induction furnace as set forth in claim 1 wherein the end of said channel adjacent said side wall extends in a vertical direction and wherein the end of said channel adjacent said bottom wall extends in a direction of from 0° to 40° above horizontal.

7. An electric induction furnace as set forth in claim 1 wherein the central portion of said channel has an outer wall which is of cylindrical curvature, wherein said refractory covering on said induction coil has an outer surface which is of cylindrical curvature, and wherein the center of curvature of said refractory covering constitutes the center of curvature of said outer wall of the central portion of said channel.

8. An electric induction furnace as set forth in claim 1 wherein said receptacle includes means for securing a refractory body within the receptacle after the channel has been preheated and prior to furnace operation thereby to change the direction of at least one end of the channel.

9. A channel type electric induction furnace for heating molten metal comprising a refractory lined receptacle having a hearth portion of large cross sectional area for holding a mass of molten metal and an induction heating portion comprising an electrical induction coil with a channel of small cross sectional area extending partially therearound for circulation therethrough of molten metal from said hearth portion to cause induction heating thereof, said hearth portion extending both above and to one side of said induction heating portion, said channel having a central portion of arcuate shape and having an inner wall formed by a refractory covering on said induction coil and an outer wall formed by side and bottom wall portions of said receptacle, the outer wall at one end of said channel being less than about 45° from vertical and the outer wall at the other end of said channel being less than about 60° from horizontal and extending in a direction divergent from the direction of the outer wall of the first-mentioned end portion of said channel.

10. A channel type electric induction heating furnace for heating molten metal comprising a refractory lined receptacle having a hearth portion of large cross sectional area for holding a mass of the molten metal and induction heating portion comprising a channel of small cross sectional area communicating at both ends thereof with said hearth portion and formed by a refractory covered induction coil positioned adjacent a wall of said receptacle, a portion of the refractory in said receptacle adjacent said channel being removably secured to said receptacle for removal therefrom, said removable portion of said refractory being shaped to alter the shape of said channel when said portion is secured to said receptacle.

11. A method for preparing for metal heating operation an induction heating comprising a refractory lined receptacle furnace of the type having an open-ended hearth portion of large cross sectional area for holding a large mass of molten metal and an induction heating portion comprising a refractory covered induction coil position adjacent a wall of said receptacle to provide an induction heating channel communicating at both ends thereof with said hearth portion, said method comprising heating said channel to high temperature by projecting hot gas through said channel from the open end of said hearth portion, altering the shape of the exposed surface of the refractory in said receptacle adjacent said channel to thereby alter the shape of said channel, and then placing molten metal in said receptacle and actuating said induction coil to cause the induction heating of said molten metal.

12. A method as set forth in claim 11 wherein the shape of the exposed surface of the refractory is altered by removably securing to said receptacle a block of refractory after said channel is heated.

* * * * *